United States Patent [19]
Guillaumon et al.

[11] Patent Number: 6,045,609
[45] Date of Patent: Apr. 4, 2000

[54] WHITE PIGMENTS STABILIZED AGAINST UV RADIATION BY AN OXIDIZING AGENT

[75] Inventors: Jean-Claude Guillaumon, Ayguesvives; Pascale Véronique Nabarra, Baziege, both of France

[73] Assignee: Centre National D'Etudes Spatiales, Paris, France

[21] Appl. No.: 09/000,035

[22] PCT Filed: May 21, 1997

[86] PCT No.: PCT/FR97/00889
§ 371 Date: Jan. 20, 1998
§ 102(e) Date: Jan. 20, 1998

[87] PCT Pub. No.: WO97/44398
PCT Pub. Date: Nov. 27, 1997

[30] Foreign Application Priority Data

May 21, 1996 [FR] France ................................. 96 06289

[51] Int. Cl.$^7$ ..................................... C04B 14/00
[52] U.S. Cl. ................... 106/425; 106/428; 106/441; 106/419; 106/401; 244/158 R
[58] Field of Search ................... 106/436, 437, 106/425, 428, 441, 419, 401; 44/158 R

[56] References Cited

U.S. PATENT DOCUMENTS

| | | |
|---|---|---|
| 3,152,000 | 10/1964 | Kingsbury et al. ................. 106/430 |
| 3,383,231 | 5/1968 | Allan et al. ....................... 106/430 |
| 3,634,027 | 1/1972 | Champetier et al. ................ 423/608 |
| 4,172,744 | 10/1979 | Ishikawa ............................ 156/79 |
| 4,239,548 | 12/1980 | Barnard et al. .................... 106/439 |
| 4,491,619 | 1/1985 | Biermann et al. .................. 428/403 |
| 4,980,206 | 12/1990 | Torre et al. ..................... 427/385.5 |
| 5,037,476 | 8/1991 | Degani et al. ..................... 106/437 |
| 5,114,486 | 5/1992 | Demosthenous et al. ........... 106/443 |
| 5,213,938 | 5/1993 | Sacripante et al. ................ 430/137 |
| 5,698,205 | 12/1997 | Bruckner et al. .................. 424/401 |
| 5,753,025 | 5/1998 | Bettler et al. .................... 106/442 |

FOREIGN PATENT DOCUMENTS

| | | |
|---|---|---|
| 0 090 241 | 10/1983 | European Pat. Off. . |
| 58-021456 | 2/1983 | Japan . |
| 60-162263 | 8/1985 | Japan . |
| 1 068 450 | 1/1984 | Russian Federation . |

OTHER PUBLICATIONS

Hawley's Condensed Chemical Dictionary, eleventh ed., Van Nostrand Reinhold, NY, entries for various borates, pp. 161, 162, 1054, 1064, 1068 (Dec. 1987).

*Primary Examiner*—C. Melissa Koslow
*Attorney, Agent, or Firm*—Jacobson, Price, Holman & Stern, PLLC

[57] ABSTRACT

The invention features in particular white mineral pigments in the form of fine particles having increased stability against solar ultraviolet radiation, characterised in that the pigment particles are coated with an oxidising agent. It is useful in the formulation of white paints for space vehicles.

14 Claims, No Drawings

WHITE PIGMENTS STABILIZED AGAINST UV RADIATION BY AN OXIDIZING AGENT

The invention relates to white pigments coated with an oxidising agent, a process for their preparation, and paints containing them.

Heat control of spacecraft calls upon a variety of techniques, in particular passive heat control.

The basis of passive heat control is the thermo-optic properties of coatings which are applied to the spacecraft, namely:

Solar absorptivity ($\alpha_s$), which is a ratio:

$$\alpha_S = \frac{\text{absorbed radiative solar flux}}{\text{incident radiative solar flux}}$$

The solar absorption coefficient is integrated over the solar spectrum between 0.2 μm and 2.8 μm.

Emissivity $\epsilon$, which is an energy radiation coefficient depending on the nature of the coatings.

All bodies emit radiation which is proportional to the fourth power of their absolute temperature, their surface area, time and their emissivity $\epsilon$.

We thus have the relationship:

$$W = \epsilon S \sigma T^4$$

where:

W: energy exchanged by radiation between the body under consideration and its environment S: area (in cm$^2$)

T: temperature of body (in K)

σ: Stefan-Boltzmann constant=5.67×10$^{-8}$ W/m$^2$.K$^4$ from which we obtain:

$$\epsilon = \frac{W}{S \sigma T^4}$$

Passive heat control coatings can be classified into a variety of categories. Particular among these, as a function of the ratio $\alpha_s/\epsilon$, are:

cold coatings ($\alpha_s/\epsilon < 1$) (for example: white paints, metallised plastic films, quartz mirrors, etc);

hot coatings ($\alpha_s/\epsilon > 1$) (for example: black paints, gilding, polished metals, etc).

White paints are constituted by a binder, at least one pigment and a solvent.

The most frequently used white pigments are: titanium dioxide ($TiO_2$), zinc oxide (ZnO), tin oxide ($SnO_2$), zinc orthotitanate ($Zn_2TiO_4$), zinc orthostannate ($Zn_2SnO_4$), tin orthotitanate ($SnTiO_4$), etc, also mixtures of these pigments.

When white paints are exposed to a space environment they degrade, particularly in their thermo-optic properties (increase in the solar absorption coefficient: $\alpha_s$), due to the combined action of different factors in this space environment, essentially due to the effects of solar ultra-violet radiation.

That solar radiation is between 180 nm and 2 800 nm and short wavelength ultra-violet radiation (180 nm to 250 nm) is responsible for almost all of the degradation.

The following hypothesis can be put forward to explain such degradation:

Under the action of UV radiation, white pigments, essentially metal oxides $MO_x$, lose oxygen to produce a product $MO_{x-y}$ which has degraded thermo-optic properties ($\alpha_s$).

The increase in the solar absorption coefficient $\alpha_s$ damages passive heat control and may be a source of overheating which could have grave consequences for the components of the spacecraft and/or the on-board equipment.

There is thus a need for white pigments which suffer reduced or even zero degradation, in particular under solar UV radiation.

The aim of the present invention is to satisfy this need.

More particularly, the invention concerns white mineral pigments in the form of fine particles having increased stability towards ultra-violet solar radiation, characterised in that the pigment particles are coated with an oxidising agent.

We have found that the oxidising agents of the invention can make up the oxygen deficit in the pigments ($MO_{x-y}$) as UV radiation causes the degradation. This results in almost complete protection of these pigments.

A pigment of the invention preferably contains 1% to 10% by weight of oxidising agent. Below 1% the improvement in stability is small while above 10% the gain in stability obtained hardly increases.

The invention also concerns a process for improving the stability of white mineral pigments towards ultra-violet solar radiation, characterised in that it consists of coating particles of a white mineral pigment with an aqueous solution of an oxidising agent, then drying the pigment particles to obtain pigment particles which are coated with oxidising agent.

One coating process could, for example, consist of dissolving an oxidising agent in water at a suitable concentration, for example between 2% and 30% by weight, depending on the oxidising agent. If necessary, the mixture can be heated to improve dissolution. The white pigment to be treated is added to the resulting solution and stirring is carried out for several hours to break up any agglomerates of particles which may be present. The pigment is allowed to settle and is then separated from the solution. The pigment is then dried, for example in an oven. Final grinding can be carried out to break up any agglomerates of particles which may have formed during drying.

Other techniques for coating particles with the oxidising agent are possible, of course, as will be clear to the skilled person.

A spray technique could be used, for example.

The coated white pigment of the invention can be used to produce white paint, in particular for use in space.

Particular examples of water-soluble oxidising agents which can be used in the invention are:

potassium, sodium, ammonium, cadmium, calcium and lithium perborates;

potassium, sodium, ammonium, calcium and lithium metaborates;

potassium, sodium, ammonium, calcium and lithium tetraborates;

aluminium, ammonium barium, calcium, cesium, lithium, potassium, sodium and strontium chlorates;

aluminium, ammonium barium, calcium, cesium, lithium, potassium, sodium and strontium perchlorates;

ammonium, barium, potassium and sodium peroxydisulfates;

potassium and sodium peroxides.

Potassium perborate or sodium perborate is currently preferred. These can be applied in the form of aqueous solutions in a concentration in the range 5% to 10%, as above this concentration the agglomerates of pigment particles which often form on drying become very hard and are thus difficult to grind. Below 5% the quantity of oxidising agent is not sufficient to protect the pigment.

The invention also concerns a white paint comprising at least one pigment, at least one film-forming binder and at least one solvent, characterised in that the pigment is a pigment in accordance with the invention and/or treated by the process of the invention. The white paints of the invention can be applied in one or more layers onto the substrate to be painted to produce paint films which advantageously have a thickness which is in the range 50 µm to 200 µm.

Any binder which is used to produce paints can be used. Non-limiting examples are silicones, potassium silicate, sodium silicate, polyurethanes, epoxy resins, acrylic resins, glycerophthalic resins, etc.

The skilled person will be able to find suitable types of binder in the abundant literature which has been published on this subject. Preferred binders for space applications are silicone resins, potassium silicate and sodium silicate.

The weight ratio of treated pigment/binder is normally in the range 2 to 12, although these values are not highly critical.

Suitable solvents include aromatic hydrocarbons (toluene, xylene, styrene, naphtha, etc), ketones (methylethylketone, methylisobutylketone, diacetone alcohol, etc), esters (ethyl acetate, butyl acetate, propyl acetate, ethyleneglycol acetate, butyleneglycol acetate, etc), glycol ethers (ethylglycol, butylglycol, methylene glycol, propylene glycol, etc), alcohols (ethanol, propanol, butanol, etc) and water. The proportion of solvent is normally in the range 0 to 60% by weight with respect to the total weight of the paint.

Layers of paints containing the treated pigments of the invention can be applied to a substrate using a paint gun, brush or any other technique known in itself.

The paints of the invention can be applied to any type of substrate, such as metals, polymeric films or composite materials. If desired, or if necessary, a layer of primer or any other primary layer can be applied before applying the paints of the invention.

In addition to their use in spacecraft, the paints of the invention can be used in the aeronautical, automobile and construction industries.

The following non-limiting examples illustrate the invention.

The pigment used in the following examples of the invention was prepared using the following procedure:

200 g of the white pigment to be treated was added to 400 ml of an aqueous solution of the oxidising agent indicated in the examples, and the combination was stirred for 4 hours. The pigment was allowed to settle and was then separated from the solution in a Büchner funnel. The pigment was then oven dried at 110° C. for 16 hours. If agglomerates of pigment particles were present, a final grinding was carried out, if necessary.

EXAMPLE 1

(Comparative)

The following method was used to test the paints of the invention in this and the subsequent examples: this accelerated test was intended to assess the behaviour of heat control coatings in spacecraft in a space environment, in particular under UV solar radiation. Samples of the coatings to be tested were placed in a sample holder kept at 40° C. for the entire test period and positioned in a vacuum chamber under a vacuum of about $5 \times 10^{-7}$ Torr.

Ultra-violet irradiation was carried out using a 4 000 watt short arc Xenon source followed by double interference filtering which delivered two ultra-violet bands. The irradiation conditions were as follows:

200 nm to 300 nm band: about 1 000 solar hour equivalents (she) carried out at an acceleration factor of about 2.5, i.e., an incident power of the order of $2.5 \times 1.62 = 4.05$ mW/cm$^2$.

300 nm to 400 nm band: about 1 000 solar hour equivalents carried out at an acceleration factor of about 2.5, i.e., an incident power of the order of $2.5 \times 10.2 = 25.5$ mW/cm$^2$.

Measurements were carried out at 0, 200 and 1 000 she; irradiation was continuous during the time periods between these points.

Optical measurements carried out in situ consisted of measuring the spectral reflectance (in the range 250 to 2 400 nm) relative to a reference sample constituted by a thin layer of aluminium evaporated onto a glass substrate. The measurement system used comprised a PERKIN ELMER λ9 spectrometer combined with an integrating sphere with a lateral sample which could be put under vacuum.

These relative measurements were complemented by absolute measurements carried out at the start and end of the test, in air, using a CARY 2300 spectrometer combined with an integrating sphere with a central sample. The correlation established at the start of the test for each sample between the in situ relative spectrum in air and the absolute spectrum produced correction coefficients for each wavelength which were applied to all subsequent in situ relative spectra.

Each reflection spectrum was associated with a solar reflectance value calculated from spectral values taken in the interval 250 to 2 400 nanometers.

The solar reflectance value ($\rho_s$) can be used to calculate the solar absorption coefficient ($\alpha_s$) using the relationship: $\alpha_s = 1 - \rho_s$ for a sample of coating which is opaque to solar radiation.

Variations in the solar reflectance or solar absorption coefficient during irradiation enabled degradation of the coatings under the action of ultra-violet radiation to be followed.

The paint of Example 1 contained untreated zinc orthotitanate pigment.

This example provides a reference and a point of comparison for the paints produced from the pigments of the invention.

A white coating close to 100 micrometers thick after drying was produced by applying to a substrate a paint prepared by the following procedure: 21 g of toluene was added to 11.50 g of RTV 121 silicone binder from RHONE POULENC, with manual stirring, and then 69 g of untreated zinc orthotitanate ($Zn_2TiO_4$) was added to the solution, with stirring.

The mixture was then ground for 30 minutes in a RED DEVIL grinding machine in a 250 ml glass flask with 100 g of glass beads.

The composition obtained was separated from the beads by sieving.

0.25 g of 10028 catalyst (RHONE POULENC) and 18 g of a diluent prepared from 47 parts by weight of ethyleneglycol diacetate and 6 parts by weight of ethyleneglycol monoethyl ether were incorporated just before the paint was applied.

The pigment/binder (P/B) ratio was 6.

After 1 000 she of ultra-violet irradiation the solar absorption factor ($\alpha_s$) had degraded by $\Delta\alpha_s = 0.08$.

EXAMPLE 2

A white coating close to 100 micrometers thick after drying was produced by applying to a substrate a paint with the following composition:

RTV 121 silicone binder (11.5 g) and 10028 catalyst (0.25 g);

pigment: zinc orthotitanate which had been treated in a 5% sodium perborate solution (69 g);

solvents: the mixture of toluene, ester and ether of Example 1.

The P/B ratio was 6.

After 1 000 she of ultra-violet irradiation the solar absorption factor ($\alpha_s$) had degraded by $\Delta\alpha_s=0.037$.

EXAMPLE 3

A white coating close to 100 micrometers thick after drying was produced by applying to a substrate a paint with the following composition:

RTV 121 silicone binder (11,5 g) and 10028 catalyst (0.25 g);

pigment: zinc orthotitanate which had been treated in a 8% sodium perborate solution (69 g);

solvents: the mixture of toluene, ester and ether of Example 1.

The P/B ratio was 6.

After 1 000 she of ultra-violet irradiation the solar absorption factor ($\alpha_s$) had degraded by $\Delta\alpha_s=0.030$.

EXAMPLE 4

A white coating close to 100 micrometers thick after drying was produced by applying to a substrate a paint with the following composition:

RTV 121 silicone binder (11.5 g) and 10028 catalyst (0.25 g);

pigment: zinc orthotitanate which had been treated in a 9% sodium perborate solution (69 g);

solvents: the mixture of toluene, ester and ether of Example 1.

The P/B ratio was 6.

After 1 000 she of ultra-violet irradiation the solar absorption factor ($\alpha_s$) had degraded by $\Delta\alpha_s=0.020$.

EXAMPLE 5

A white coating close to 100 micrometers thick after drying was produced by applying to a substrate a paint with the following composition:

RTV 121 silicone binder (11.5 g) and 10028 catalyst (0.25 g);

pigment: zinc orthotitanate which had been treated in a 10% sodium perborate solution (69 g);

solvents: the mixture of toluene, ester and ether of Example 1.

The P/B ratio was 6.

After 1 000 she of ultra-violet irradiation the solar absorption factor ($\alpha_s$) had degraded by $\Delta\alpha_s=0.007$.

EXAMPLE 6

A white coating close to 100 micrometers thick after drying was produced by applying to a substrate a paint with the following composition:

RTV 121 silicone binder (11.5 g) and 10028 catalyst (0.25 g);

pigment: zinc orthotitanate which had been treated in a 5% sodium tetraborate solution (69 g);

solvents: the mixture of toluene, ester and ether of Example 1.

The P/B ratio was 6.

After 1 000 she of ultra-violet irradiation the solar absorption factor ($\alpha_s$) had degraded by $\Delta\alpha_s=0.05$.

EXAMPLE 7

A white coating close to 100 micrometers thick after drying was produced by applying to a substrate a paint with the following composition:

RTV 121 silicone binder (11.5 g) and 10028 catalyst (0.25 g);

pigment: zinc orthotitanate which had been treated in a 10% sodium tetraborate solution (69 g);

solvents: the mixture of toluene, ester and ether of Example 1.

The P/B ratio was 6.

After 1 000 she of ultra-violet irradiation the solar absorption factor ($\alpha_s$) had degraded by $\Delta\alpha_s=0.04$.

EXAMPLE 8

A white coating close to 100 micrometers thick after drying was produced by applying to a substrate a paint with the following composition:

RTV 121 silicone binder (11.5 g) and 10028 catalyst (0.25 g);

pigment: zinc orthotitanate which had been treated in a 20% sodium perchlorate solution (69 g);

solvents: the mixture of toluene, ester and ether of Example 1.

The P/B ratio was 6.

After 1 000 she of ultra-violet irradiation the solar absorption factor ($\alpha_s$) had degraded by $\Delta\alpha_s=0.05$.

EXAMPLE 9

A white coating close to 100 micrometers thick after drying was produced by applying to a substrate a paint with the following composition:

RHODORSIL 10336 silicone binder (20 g) from RHONE POULENC;

pigment: zinc orthostannate which had been treated in a 5% sodium perborate solution (75 g);

solvents: the mixture of toluene, ester and ether of Example 1.

The P/B ratio was 7.5.

After 1000 she of ultra-violet irradiation the solar absorption factor ($\alpha_s$) had degraded by $\Delta\alpha_s=0.02$, while this degradation was $\Delta\alpha_s=0.035$ for an untreated zinc orthostannate pigment.

What is claimed is:

1. White mineral pigments in the form of fine particles having increased stability towards ultra-violet solar radiation, wherein the pigment particles are selected from the group consisting of zinc oxide (ZnO), tin oxide ($SnO_2$), zinc orthotitanate ($Zn_2TiO_4$), zinc orthostannate ($Zn_2SnO_4$), tin orthotitanate ($SnTiO_4$) and mixtures thereof, and wherein the pigment particles are coated with an oxidising agent.

2. White pigments according to claim 1, wherein the oxidising agent is selected from the group consisting of:

potassium, sodium, ammonium, cadmium, calcium and lithium perborates;

potassium, sodium, ammonium, calcium and lithium metaborates;

potassium, sodium, ammonium calcium and lithium tetraborates;

aluminum, ammonium, barium, calcium, cesium, lithium, potassium, sodium and strontium cholorates;

aluminium, ammonium, barium, calcium, cesium, lithium, potassium, sodium and strontium perchlorates;

ammonium, barium, potassium and sodium peroxydisulfates; and potassium and sodium peroxides.

3. Pigments according to claim 2 wherein the oxidising agent is sodium perborate or potassium perborate.

4. Pigments according to claim 1, wherein they contain 1% to 10% by weight of oxidising agent.

5. Process for improving the stability of white mineral pigments towards ultra-violet solar radiation, which comprises the steps of coating particles of a white mineral pigment selected from the group consisting of zinc oxide (ZnO), tin oxide ($SnO_2$), zinc orthotitanate ($Zn_2TiO_4$), zinc orthostannate ($Zn_2SnO_4$), tin orthotitanate ($SnTiO_4$ and mixtures thereof with an aqueous solution of an oxidising agent and then drying said pigment particles so as to obtain pigment particles coated with oxidising agent.

6. Process according to claim 5, wherein said oxidising agent is selected from the group consisting of:

potassium, sodium, ammonium, cadmium, calcium and lithium perforates;

potassium, sodium, ammonium, calcium and lithium metaborates;

potassium, sodium, ammonium, calcium and lithium tetraborates;

aluminium, ammonium, barium, calcium, cesium, lithium, potassium, sodium and strontium chlorates;

aluminium, ammonium, barium, calcium, cesium, lithium, potassium, sodium and strontium perchlorates;

ammonium, barium, potassium and sodium peroxydisulfates; and potassium and sodium peroxides.

7. Process according to claim 5, wherein said the aqueous solution contains 2% to 30% by weight of oxidising agent.

8. Process according to claim 6, wherein said aqueous solution is sodium perborate or potassium perborate.

9. Process according to claim 8, wherein said aqueous solution contains 5% to 10% by weight of oxidising agent.

10. Process for improving the stability of white mineral pigments towards ultra-violet solar radiation, which comprises the steps of coating particles of a white mineral pigment selected from the group consisting of zinc oxide (ZnO), tin oxide ($SnO_2$), zinc orthotitanate ($Zn_2TiO_4$), zinc orthostannate ($Zn_2SnO_4$), tin orthotitanate ($SnTiO_4$) and mixtures thereof with an aqueous solution consisting essentially of an oxidising agent and then drying said pigment particles so as to obtain pigment particles coated with oxidising agent.

11. White paint comprising particles of at least one pigment, at least one film-forming binder and at least one solvent, wherein said pigment particles are selected from the group consisting of zinc oxide (ZnO), tin oxide ($SnO_2$) zinc orthotitanate ($Zn_2TiO_4$), zinc orthostannate ($Zn_2SnO_4$), tin orthotitanate ($SnTiO_4$) and mixtures thereof, and wherein said pigment particle are coated with an oxidizing agent.

12. A spacecraft at least partially coated with at least one layer of white paint, said white paint comprising particles of at least one pigment, at least one film-forming binder and at least one solvent, wherein said pigment particles are selected from the group consisting of zinc oxide (ZnO), tin oxide ($SnO_2$), zinc orthotitanate ($Zn_2TiO_4$), zinc orthostannate ($Zn_2SnO_4$), tin orthotitanate ($SnTiO_4$) and mixtures thereof and wherein said pigment particles are coated with an oxidising agent, wherein said white paint provides increased stability to ultra-violet solar radiation.

13. White paint comprising at least one pigment, at least one film-forming binder and at least one solvent characterised in that the pigment is treated by a process which comprises the steps of coating particles of a white mineral pigment selected from the group consisting of zinc oxide (ZnO), tin oxide ($SnO_2$) zinc orthotitanate ($Zn_2TiO_4$), zinc orthostannate ($Zn_2SnO_4$), tin orthotitanate ($SnTiO_4$) and mixtures thereof with an aqueous solution of an oxidising agent and then drying said pigment particles so as to obtain pigment particles coated with oxidising agent.

14. White mineral pigments in the form of fine particles having increased stability towards ultra-violet solar radiation, the pigment particles being selected from the group consisting of zinc oxide (ZnO), tin oxide ($SnO_2$) zinc orthotitanate ($Zn_2TiO_4$) zinc orthostannate ($Zn_2SnO_4$), tin orthotitanate ($SnTiO_4$) and mixtures thereof, the pigment particles having a coating consisting essentially of an oxidising agent.

* * * * *